F. C. COSEO.
COIL RETAINER.
APPLICATION FILED APR. 17, 1917.

1,414,773. Patented May 2, 1922.

WITNESSES:
Harry C. Dean
Dudley T. Fisher

INVENTOR.
BY Frederick C. Coseo
H. H. Bliss
ATTORNEY.

UNITED STATES PATENT OFFICE.

FREDERICK C. COSEO, OF COLUMBUS, OHIO, ASSIGNOR TO THE JEFFREY MANUFACTURING COMPANY, OF COLUMBUS, OHIO, A CORPORATION OF OHIO.

COIL RETAINER.

1,414,773.

Specification of Letters Patent.    Patented May 2, 1922.

Application filed April 17, 1917. Serial No. 162,726.

*To all whom it may concern:*

Be it known that I, FREDERICK C. COSEO, a citizen of the United States, residing at Columbus, in the county of Franklin and State of Ohio, have invented certain new and useful Improvements in Coil Retainers, of which the following is a specification, reference being had therein to the accompanying drawing.

The present invention relates to certain new and useful improvements in resilient coil retainers adapted to secure the field coils upon the pole pieces of electric motors.

The object is to provide retaining devices which will be adapted to yieldingly, but firmly, hold a coil of a relatively widely extended base at its outer end, snugly against the frame metal, and which will bear directly against the inner narrowed end of the coil and against the pole metal, and bear in such way as to uniformly distribute the pressure and accomplish this by delicately acting devices.

The devices by which I accomplish this purpose are fully set forth in the following specification and illustrated in the accompanying drawings of which—

Like numerals refer to similar parts in the several figures.

Figure 3:
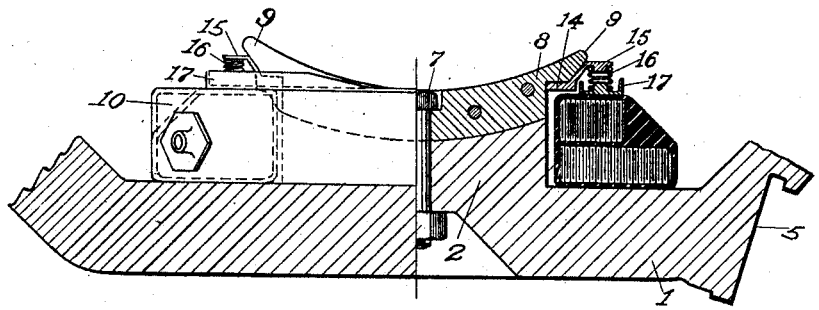
Fig. 3 is a section along the line 3—3 of Fig. 2.
Figure 4:
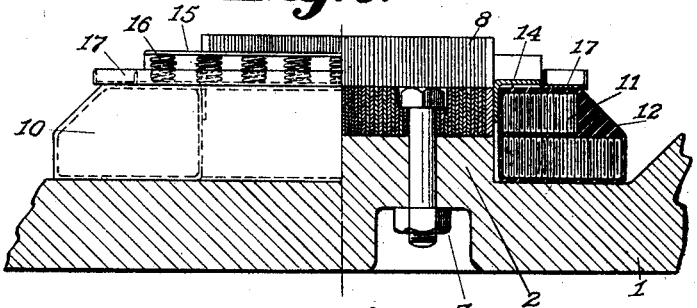
Fig. 4 is a section along the line 4—4 of Fig. 2.
Figure 2:
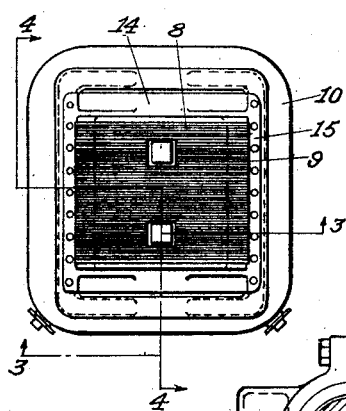
Fig. 2 is a plan view of one of the poles of such a motor showing the relation of the field coil and coil retainer thereto.
Figure 1:
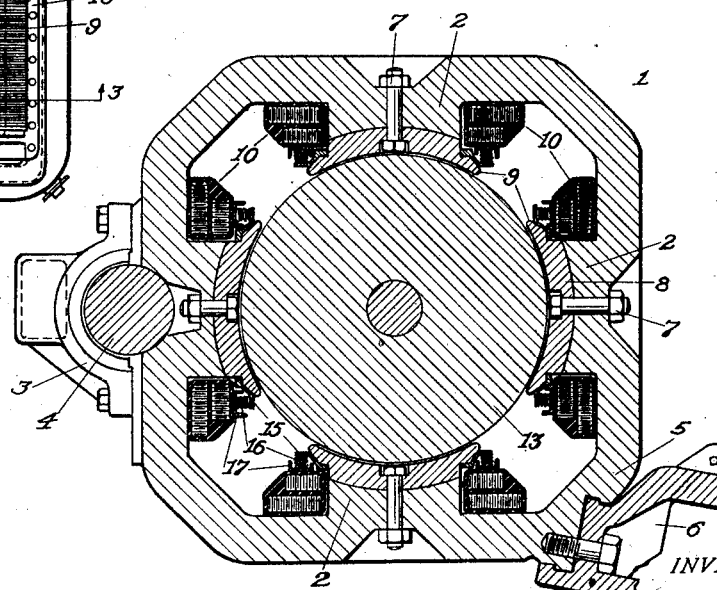
Fig. 1 is a transverse section through the field frame of a four pole electric railway motor equipped with the devices of my invention.

For purposes of illustration I have shown, in Fig. 1 of the drawings, a section taken along the transverse central plane of an electric motor, of well known construction, adapted to railway service. The field frame of this motor comprises a magnetic yoke 1 upon which is formed four field poles 2. At one side of the field yoke 1 is formed a journal bearing 3 by which the motor is supported upon the axle 4 of the locomotive. At 5 on the side of the yoke 1 opposite to the axle 4 the field frame is adapted to engage with an abutment 6, attached to the frame of the locomotive, to prevent rotation of the motor about the axle 4. Attached to the field poles 2 by the attachment bolts 7 are the customary laminated pole shoes 8 having projecting pole tips 9. Each of the field poles is encircled by a field coil 10 composed of a suitable electric conductor 11 wound upon itself and wrapped with suitable insulation 12 in the manner common to field coils. The coils 10 are connected into the circuits of the motor in such manner that the electric current will flow through the conductor 11 of the coils in a direction to energize the field poles to produce the desired rotation of the armature 13. As these connections form no part in the present invention they have been omitted from the drawings for the sake of simplicity, and are not thought to require further description at this time.

Surrounding the pole shoes 8 of each of the field poles is a non magnetic casting 14 which forms the abutment member of my improved coil retainer. At each side of the pole shoe 8 the abutment member 14 bears upon the outer surface of the projecting pole tips 9. Laterally extending flanges 15 are formed at each side of the abutment member against which abut a plurality of outwardly extending compression springs 16. The outer ends of the springs 16 contact with a non magnetic retaining plate 17 which bears upon the inner surface of the field coils 10 to press it outwardly into contact with the field frame 1. The pressure of the spring 16 upon the retaining plate 17 is sufficient to prevent movement of the coil relative to the field frame and the resiliency of the springs permits the expansion and contraction of the coil without injury to the insulation.

I am aware of the fact that it has been heretofore proposed to hold the coil in position by resilient retainers. Generally the device proposed for this have been arranged between the curved frame metal and the coil; and the retainers have been placed in such way that the base or outer end of the coil was held at a distance from the frame. In the cases where the retainer was placed between the pole and the coil, use was made of elastic plates extending integrally from side to side of the core.

I apply the elastic action at each of numerous points by devices which permit the retainer to conform more delicately and closely to the positions of the different parts of the coil. I employ a plurality of small springs distributed between the two loose plates 14 and 17. These extend around the core and apply pressure uniformly and in such way as to hold the wide base of the coil uniformly against the outer frame metal, avoiding losses of the magnetic lines and keeping the parts constantly in efficient relationship.

One of the serious difficulties incident to the use of retaining devices of this class has been the reducing of the space between the pole tips and the frame metal which should be occupied by coil metal as completely as possible. In earlier devices either a space relatively deep (on the radii of the armature) at the inner or pole end has been lost, or a space at the outer or frame end of the core. When the parts are constructed and arranged as I have shown there is, practically, no loss of space at all. The core metal is radially short, the plane at the inner extremity of the coil is in, or nearly in, the tangent plane at the bottom of the curved surface of the pole, and the coil is extended outward to have its base end immediately adjacent the frame metal. The abutment device at 15 is nearly in the transverse or tangent plane of the pole tip 9, although its holder plate at 14 is in the same transverse or tangent planes with the pressure plate 17. That is to say, I reach the utmost economizing possible of available space for the mounting of the resilient retainers.

What I claim is—

In a coil retainer of the class described, the combination with a dynamo electric machine comprising a field frame having inwardly projecting poles with laterally projecting pole tips and field coils upon the poles, of pairs of non magnetic pole-encircling members interposed between said pole tips and said coils, and a plurality of independent and separately removable springs arranged to force said members apart thereby exerting outward pressure upon said coils.

In testimony whereof I affix my signature in presence of two witnesses.

FREDERICK C. COSEO.

Witnesses:
HARRY C. DEAN,
DUDLEY T. FISHER.